Figure 5:
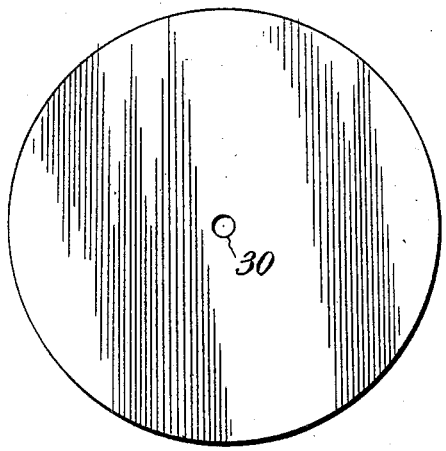

No. 756,345. PATENTED APR. 5, 1904.
T. P. EPES.
TELLURIAN.
APPLICATION FILED OCT. 24, 1902.
NO MODEL. 3 SHEETS—SHEET 1.
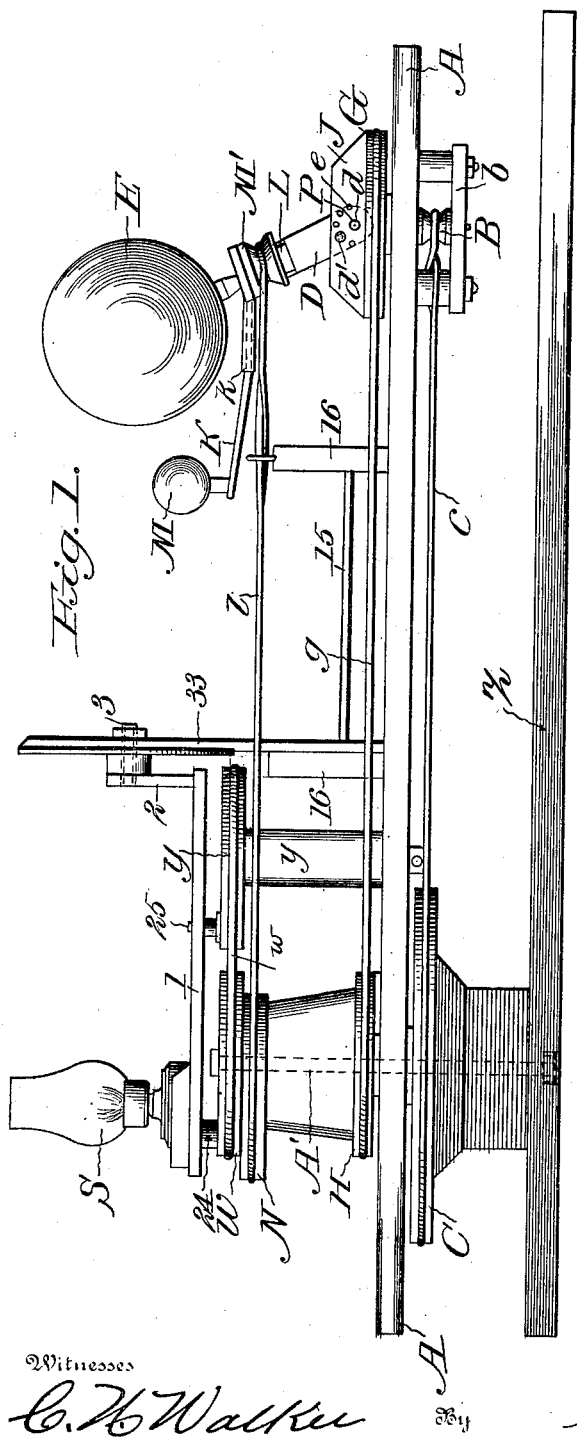
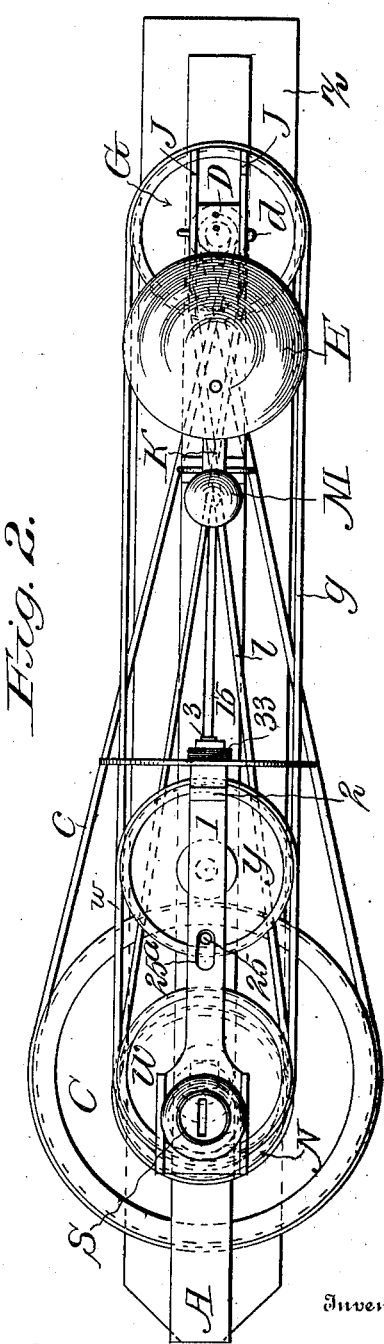
Witnesses
C. H. Walker
Geo. E. Few
Inventor
T. P. Epes
By Milo B. Stevens & Co.
Attorneys

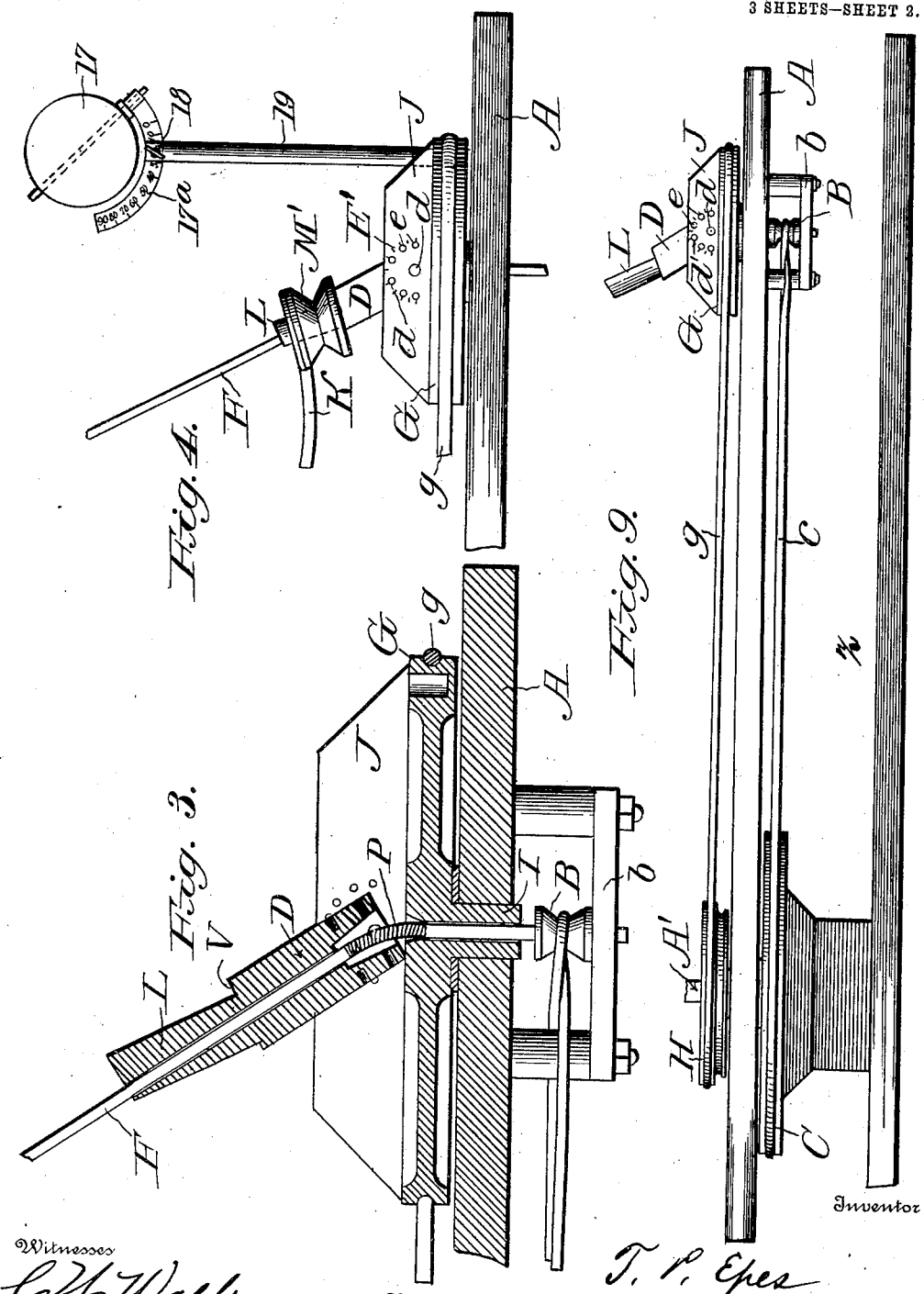

No. 756,345. PATENTED APR. 5, 1904.
T. P. EPES.
TELLURIAN.
APPLICATION FILED OCT. 24, 1902.
NO MODEL. 3 SHEETS—SHEET 3.

Witnesses
C. H. Walker.
Geo. E. Tew.

Inventor
T. P. Epes
By Milo B. Stevens & Co.
Attorneys

No. 756,345.

Patented April 5, 1904.

UNITED STATES PATENT OFFICE.

THEODORICK PRYOR EPES, OF BLACKSTONE, VIRGINIA.

TELLURIAN.

SPECIFICATION forming part of Letters Patent No. 756,345, dated April 5, 1904.

Application filed October 24, 1902. Serial No. 128,541. (No model.)

*To all whom it may concern:*

Be it known that I, THEODORICK PRYOR EPES, a citizen of the United States, residing at Blackstone, in the county of Nottoway and State of Virginia, have invented certain new and useful Improvements in Tellurians; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tellurians; and the object thereof is to form an improved apparatus for illustrating the phenomena dependent on the movements of the earth and moon with respect to the sun and to each other.

A further object is to form a novel light apparatus for showing the distribution of the sun's light and heat over the surface of the earth at the solstices, the equinoxes, and through the zones, the intervening seasons, the inequality of day and night, sunrise and sunset, the moon, meridian, longitude, the variation of time at different places, &c.

A further object is to form, in connection with other parts of a tellurian, an inclinator or telluric globe to illustrate change of tropical and arctic circles, of the ecliptic, of zones, of day and night, seasons, and climate for all possible variations in the inclination of the earth's axis.

With these and other objects in view the invention is hereinafter described and is illustrated in the accompanying drawings, in which—

Figure 1 is a side elevation of the apparatus. Fig. 2 is a plan thereof. Fig. 3 is a partial vertical section showing the flexible shaft of the earth-globe and its mountings. Fig. 4 is a side elevation of the inclinator or telluric globe, the earth and moon globes being removed. Figs. 5, 6, 7, and 8 are face views of various forms of disks used to bring out the phenomena illustrated by the light apparatus, and Fig. 9 is a fragmentary view illustrating means for showing the precession of the equinoxes.

The tellurian is preferably lined and started from the June solstice, and in the drawings S indicates a lamp which represents the sun; M, the moon-globe; E, the earth-globe; Z, the baseboard, and A' the main-axis axle; and the construction and the operation of the apparatus will be described, together with explanations showing the relation of such operation to the phenomena intended to be illustrated thereby.

As to the earth: Its year or its annual revolution around the sun is produced by a main arm A, which by proper manipulation by the operator turns around the main axis and carries the earth-globe therewith on mountings to be hereinafter described. Its daily rotation is produced by a small pulley B, carried in a bracket $b$ on the under side of the main arm. This pulley is fixed to a flexible shaft F, forming the axis of the earth, and is driven by a band $c$ from a large driving-wheel C, fast on the main axle. The carrier and journal-box of the earth's shaft F is indicated at D, and the inclination of the earth's axis is produced by setting said box at an angle of twenty-three and one-half degrees between two flanges J on the top of a guide-wheel G, which is free to rotate on a hollow spindle I, carried by the main arm. The flexible shaft F extends through the hollow spindle. The box D is supported between the flanges by a pivot-pin $d$ and an adjustment-pin $d'$, and the box may be adjusted by inserting the latter pin in any one of a series of holes $e$, according to a quadrant E', marked on one of the flanges, thereby varying the inclination of the earth's axis to various angles, whereby conditions at different angles may be illustrated. The parallelism of the earth's axis during the whole year is maintained by the wheel G, above referred to, which carries the journal-box of the earth's shaft and which is driven by a band $g$ from a wheel H of the same size, fixed on the main axle A'. The guide-wheel G thus makes one complete rotation during the yearly revolution and keeps the earth's axis parallel to itself during the whole of its orbit. It will be seen that by this construction the parallelism of the earth's axis is maintained independent of its inclination. As will be understood, the earth-shaft is flexible only at the lower end, where it is bent.

As to the moon: Its globe is carried by the arm K, which is fixed to and projects from a pulley M', which rotates on a hollow spindle L, projecting from the box D, said pulley being driven by a band l from a wheel N, fixed on the main axle A'. Said wheel N is mounted eccentric on the axle, the eccentricity being equal to the eccentricity of the center of the pulley M' with respect to the axis of the pulley B when the axis of the earth is inclined at an angle of twenty-three and a half degrees, whereby the distance between the wheel N and the pulley M' is preserved during the whole revolution of the earth and moon. The arm K is jointed, as at k, so that the moon-globe may be removed without unshipping the band or other parts. The inclination of the moon to the ecliptic is thus provided for: The spindle L, on which the pulley M' rotates, does not project parallel to the axis of the box D, but at an angle of about six degrees thereto, and accordingly the top V of the box D, on which the pulley rests, is made at a right angle to said spindle, whereby the axis of the moon's revolution is about six degrees askew relative to the axis of the earth's rotation. This construction permits an illustration of the retrogradation of the moon's nodes by turning the carrier-box D on its longitudinal axis. The box is made square and provided with holes through both directions to receive the pins d d', so that it may be turned at a right angle to permit its change to show the retrogradation of the line of intersection between the plane of the moon's orbit and the plane of the ecliptic. By making the box round and providing a larger number of holes the box may be turned and the variation illustrated to degrees other than a right angle.

As to the sun: The lamp representing the sun is mounted at the same altitude as the center of the earth-globe on an arm 1, which is pivoted at 24 directly under the sun-lamp to a wheel W, fast on the main axle A'. At its outer end the arm carries a standard 2, which supports a tube 3 in such position that a pencil through the tube is directed to the center of the earth the year round. To effect the necessary horizontal swing of the arm 1 to produce this result, the arm is mounted eccentric on the wheels W and Y at the pivot 24 on the wheel W, as above stated, and upon a pin 25 on the wheel Y, which latter wheel is supported and rotates on a spindle at the top of the standard y, carried by the main arm A. The pin 25 extends through a slot 25ᵃ in the arm 1 to allow for the lateral motion. The wheels W and Y are of the same size, and the latter is driven from the former by a band w. The eccentricity of the pins 24 and 25 is the same as the eccentricity of the earth's center with respect to the axis of the wheel G, and the resulting motion will cause the pencil through the tube 3 to be directed always to the center of the earth during the whole year. The sun-lamp above the pivot 24 is at the center of the orbit in which the earth moves.

To bring out clearly certain phenomena in connection with the light apparatus, the disks illustrated in Figs. 5, 6, 7, and 8 are used. These disks are all provided with a central hole 30, whereby they may be mounted on the tube 3, as shown in Fig. 1. The disk shown in Fig. 5 is solid except at the hole 30 and when placed on the tube 3 shuts off from the earth all of the sun's light except the pencil through the tube. This finds the equator and the tropics, and thereby tells the equinoxes and the solstices when the ray falls on those points in the yearly movement.

Figure 6:
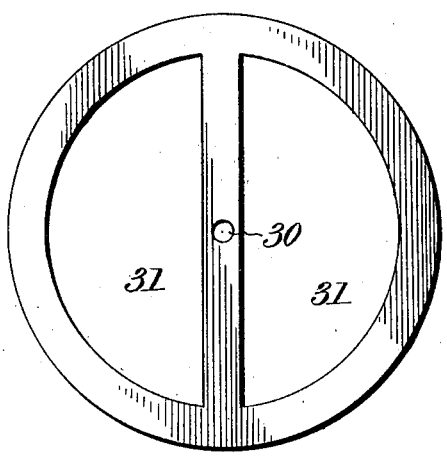

The disk shown in Fig. 6 is cut out in circular form, as at 31, till a circle of light will cover a hemisphere of the earth. The passing of a point into and out of this circle of light tells sunrise and sunset during the rotation of the earth and shows variation in time, twilight, &c.

Figure 7:
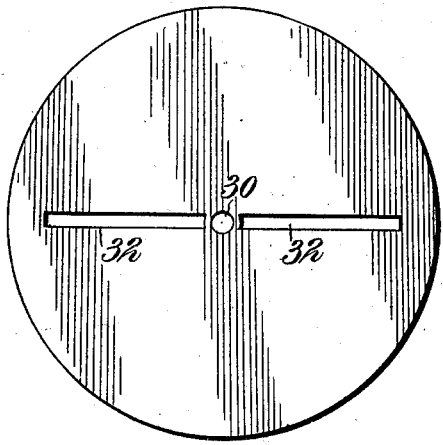

The disk shown in Fig. 7 is solid except a horizontal slot 32. When this disk is placed on the tube 3, the horizontal rays through the slot trace the ecliptic, and when placed vertically on the tube the light through the slot finds the arctic circles and shows the play of light beyond the poles.

Figure 8:
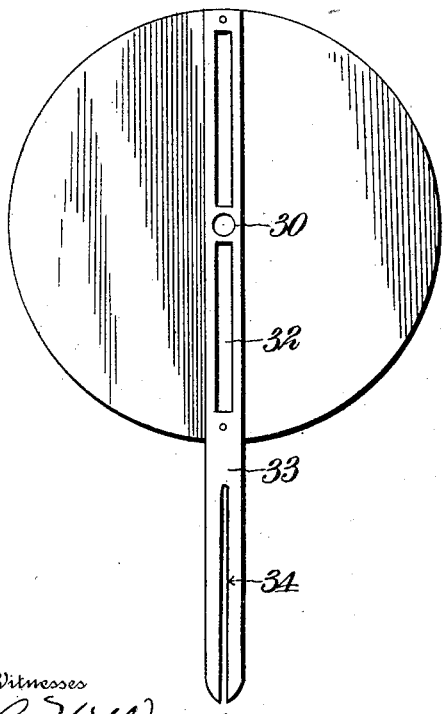

The disk shown in Fig. 8 is the same as that shown in Fig. 7 except that it is provided with a staff 33, slotted, as at 34. When it is placed vertically on the tube 3, the slit in the lower end of the staff works on a guide-pin 15, which is supported by uprights 16 on the arm A at a height above said arm equal to the height of the pivotal point P at the bend of the flexible shaft where it enters the box D above that arm. Inasmuch as the tube 3 is level with the center of the earth, the disk will in the revolution of the earth work thereon and also along the guide-pin 15 level with another point in the earth's axis P. Hence it must work in line with that axis all the time and turn on the tube and lean accordingly as the arm 1 swings. The light through the slot 32 will thus be parallel to the axis of the earth at all points of the revolution and will mark and trace the noon-meridian, show the variation in time at different places, &c.

The results of variation in the inclination of the earth's axis may be illustrated after removing the band l. The earth's axis can then be inclined at different angles; but the inclinator illustrated in Fig. 4 comprises a globe 17, which is adapted to show more conveniently than the earth-globe could the variation of the inclination of the earth's axis at all angles from naught degrees to ninety degrees and at some angles to which the box D could not be depressed. The globe 17 is mounted on a spindle on a graduated quadrant 17ª, adjustably supported at the top of a standard 19, the adjustment being fixed at any angle by a binding-screw 18. The standard is of proper height to bring the center of the globe into the pencil through the tube 3 and is mounted in a socket in the guide-wheel G, with eccentricity the same as the eccentricity of the pivot 24 and guide-pin 25 of the light-arm 1. When this inclinator is used, the earth-globe and moon-globe are taken off and the moon-arm K disjointed, so that the inclinator-globe may be revolved, whereby it will illustrate the change of the circles, the ecliptic, zones, day and night, seasons and climate, &c., for all possible variations in the inclination of the axis of the globe.

Precession of the earth's equinoxes may be shown by slightly increasing the size of the driving-wheel H, as by putting a rubber band into the groove of the wheel. This will bring the guide-wheel G a little earlier each time to the solstices and equinoxes, the band $l$ of the moon-pulley being first removed, or the wheel H may have two grooves, one making the wheel a little larger than the wheel G and changing the band to this second groove, as illustrated in Fig. 9, when precession is to be illustrated.

What I claim as new, and desire to secure by Letters Patent, is—

1. In a tellurian, the combination with the fixed axis, an earth-globe revoluble around the same, and means to rotate the globe on an inclined axis and to maintain the parallelism thereof, of a sun device mounted eccentric to the axis, the eccentricity being equal to one-half the variation in distance of the earth-globe, in its orbit, from said fixed axis.

2. In a tellurian, the combination with an earth-globe having an inclined axis, revoluble in an elliptical orbit produced by the inclination of the axis, and means to maintain the parallelism of its axis, of a sun-lamp and means to direct a pencil of light from the lamp to the center of the earth-globe during the whole of its revolution.

3. In a tellurian, the combination with a sun-lamp and an earth-globe having an inclined axis, and means to revolve the latter around the former in an elliptical orbit produced by the inclination of the axis, of a disk maintained between the lamp and globe, having an aperture through which the light of the lamp is directed toward the center of the globe during the whole of its revolution.

4. In a tellurian, the combination with a sun-lamp and earth-globe, and means to produce their relative motions, of a pencil-tube supported between the lamp and globe, through which the light shines on the globe during said motions, and a removable disk on the tube, having an aperture through which the light shines on the globe, to illustrate solar phenomena.

5. In a tellurian, the combination with a sun-lamp and earth-globe, and means to produce their relative motions, of a disk between the lamp and globe having a slot through which the light shines on the globe.

6. In a tellurian, the combination with a sun-lamp, and an earth-globe having an inclined axis, and means to revolve the globe around the lamp and maintain the parallelism of said axis, of a disk between the lamp and globe, having a slot in line with the axis of the globe, and means to maintain the alinement of said slot and axis during the whole revolution.

7. In a tellurian, the combination with a central axle and an arm turning thereon, of earth and moon globes carried by the arm, driving connections between the axle and the globes, producing representative motions thereof, a wheel fast on the axle, a sun-lamp eccentric thereon, another wheel carried by the arm and having driving connection with said wheel, an arm connected eccentrically to said wheels and guided thereby, and a light-controlling device carried by said arm between the lamp and the globes.

8. In a tellurian, the combination with a central axle and a supporting-arm turning thereon, of an earth-globe, a guide-wheel journaled on the arm and driven by the movement thereof, to maintain the parallelism of the axis of the earth-globe, a flexible shaft on which the earth-globe is mounted, having driving connections with the axle, and a journal-box for the shaft, supported on the guide-wheel and adjustable thereon to vary the inclination of the shaft.

9. In a tellurian, the combination with the earth-globe and a flexible shaft on which it is mounted, of an adjustable journal-box for the shaft, having a spindle projecting therefrom, a pulley on the spindle having a moon-globe-supporting arm projecting therefrom, and means to drive the shaft and the pulley.

10. In a tellurian, the combination with an earth-globe and a flexible shaft on which it is mounted, of a carrier-box for the shaft having a longitudinally-projecting spindle slightly askew, a pulley on the spindle, having a moon-globe-supporting arm, said box being adjustable on its longitudinal axle to vary the inclination of the spindle and arm, and means to drive the shaft and pulley.

11. In a tellurian, the combination with the main supporting-arm turning on a central axis, the rotating guide-wheel carried thereby, and the earth-globe, of a flexible shaft for said globe extending through the center of the wheel, a journal-box for said shaft mounted on the wheel, and means to drive the shaft and wheel by the turn of the arm.

12. The combination with the central axis and the main supporting-arm turning thereon, the rotatable guide-wheel on the arm, and an earth-globe, of a flexible shaft for said globe extending through the center of the wheel, an adjustably-inclined journal-box for said shaft, mounted on the wheel, a spindle projecting angularly from the journal-box, said box having adjustment to vary the direction of projection of the spindle, a pulley on the spindle, a moon-globe-supporting arm extending from the pulley, and means to drive the wheel, the shaft and the pulley by the turn of the main arm.

13. In a tellurian, the combination with the central axle, the arm turning thereon, the earth-globe and its bent flexible shaft, the guide-wheel journaled on the arm, and the box supported on the wheel and carrying the shaft at an inclination, of the moon-pulley rotatably supported on the box eccentric to the guide-wheel, and a driving-wheel on the central axle, for said pulley, having equal eccentricity.

14. In a tellurian, the combination with the journal-box for the shaft of the earth-globe, of the tubular spindle projecting angularly from the box, through which the shaft extends, the moon-pulley on the spindle, and the moon-globe-supporting arm projecting from the pulley.

15. In a tellurian, the combination with the guide-wheel G, for maintaining the parallelism of the earth's axis, of the driving-wheel H at the center of the earth's revolution, said driving-wheel having two peripheral driving-faces of different diameters.

In testimony whereof I affix my signature in presence of two witnesses.

THEODORICK PRYOR EPES.

Witnesses:
SALLIE SPENCER,
JOUETT SPENCER.